(12) United States Patent
Murakami

(10) Patent No.: US 11,549,869 B2
(45) Date of Patent: Jan. 10, 2023

(54) SPECIMEN PREPARATION METHOD AND SPECIMEN PREPARATION DEVICE

(71) Applicant: HIRATA CORPORATION, Kumamoto (JP)

(72) Inventor: Seigo Murakami, Kumamoto (JP)

(73) Assignee: HIRATA CORPORATION, Kumamoto (JP)

( * ) Notice: Subject to any disclaimer, the term of this patent is extended or adjusted under 35 U.S.C. 154(b) by 41 days.

(21) Appl. No.: 16/688,391

(22) Filed: Nov. 19, 2019

(65) Prior Publication Data

US 2020/0088612 A1 Mar. 19, 2020

Related U.S. Application Data

(63) Continuation of application No. PCT/JP2018/026506, filed on Jul. 13, 2018.

(30) Foreign Application Priority Data

Jul. 19, 2017 (JP) .............................. JP2017-140276

(51) Int. Cl.
*G01N 1/28* (2006.01)
*B01L 3/00* (2006.01)
*B01L 9/00* (2006.01)

(52) U.S. Cl.
CPC .................. *G01N 1/28* (2013.01); *B01L 3/52* (2013.01); *B01L 9/52* (2013.01); *B01L 2200/16* (2013.01);
(Continued)

(58) Field of Classification Search
CPC ..... G01N 1/28; B01L 3/52; B01L 9/52; B01L 2200/16; B01L 2300/06; B01L 2300/165
See application file for complete search history.

(56) References Cited

U.S. PATENT DOCUMENTS 6,207,000 B1 3/2001 Schwobel et al.
6,579,457 B1 * 6/2003 Ehrnsperger ...... A61F 13/15203
210/321.6
(Continued)

FOREIGN PATENT DOCUMENTS

CN 1233079 A 10/1999
CN 104614520 A 5/2015
(Continued)

OTHER PUBLICATIONS

Extended European Search Report dated May 7, 2020, issued by the European Patent Office in corresponding European Application No. 18836112.5. (15 pages).
(Continued)

*Primary Examiner* — Samuel P Siefke
*Assistant Examiner* — Tingchen Shi
(74) *Attorney, Agent, or Firm* — Buchanan Ingersoll & Rooney PC

(57) ABSTRACT

The present invention is a specimen preparation method of preparing an observation specimen by placing an observation object on a light transmitting plate, comprising a conveyance step of conveying the observation object by a conveyance mechanism including a placement portion configured to place the observation object, and a transfer step of transferring the observation object from the placement portion of the conveyance mechanism onto the plate at a conveyance terminal end of the conveyance mechanism, wherein in the transfer step, a liquid is supplied to the placement portion on which the observation object is placed, and the observation object is carried by a flow of the liquid and transferred onto the plate.

7 Claims, 12 Drawing Sheets

(52) U.S. Cl.
CPC ..... *B01L 2300/06* (2013.01); *B01L 2300/161* (2013.01); *B01L 2300/165* (2013.01)

(56) References Cited

U.S. PATENT DOCUMENTS

| | | | |
|---|---|---|---|
| 2002/0146540 A1* | 10/2002 | Johnston | A61F 13/53708 |
| | | | 428/167 |
| 2005/0282292 A1 | 12/2005 | Torre-Bueno | |
| 2006/0108287 A1* | 5/2006 | Arnold | B01D 71/56 |
| | | | 210/638 |
| 2013/0167770 A1 | 7/2013 | Shoffner et al. | |
| 2014/0026683 A1 | 1/2014 | Hayworth et al. | |
| 2014/0287423 A1* | 9/2014 | Nurse | C12Q 1/6806 |
| | | | 435/6.12 |
| 2015/0008096 A1* | 1/2015 | Ito | G02B 21/34 |
| | | | 198/339.1 |
| 2015/0168276 A1* | 6/2015 | Orfield | G01N 35/00029 |
| | | | 356/244 |
| 2016/0069916 A1* | 3/2016 | Loo | B01L 3/5082 |
| | | | 435/34 |
| 2016/0290991 A1* | 10/2016 | Okamura | G01N 15/1459 |
| 2017/0284910 A1 | 10/2017 | Orfield et al. | |

FOREIGN PATENT DOCUMENTS

| | | | |
|---|---|---|---|
| DE | 3631066 | A1 | 4/1988 |
| EP | 2 813 832 | A1 | 12/2014 |
| JP | H07-024813 | A | 1/1995 |
| JP | H09243522 | A | 9/1997 |
| JP | H1135151 | A | 2/1999 |
| JP | 2000331972 | A | 11/2000 |
| JP | 2001233442 | A | 8/2001 |
| JP | 2007057255 | A | 3/2007 |
| JP | 2007187603 | A | 7/2007 |
| JP | 2008076249 | A | 4/2008 |
| JP | 2008151657 | A | 7/2008 |
| JP | 2008164521 | A | 7/2008 |
| JP | 2013160718 | A | 8/2013 |
| WO | 2015/095403 | A1 | 6/2015 |

OTHER PUBLICATIONS

International Preliminary Report on Patentability (PCT/IPEA/409) dated Oct. 16, 2019, by the Japan Patent Office as the International Preliminary Examination Authority for International Application No. PCT/JP2018/026506.
International Search Report (PCT/ISA/210) dated Oct. 9, 2018, by the Japan Patent Office as the International Searching Authority for International Application No. PCT/JP2018/026506.
Written Opinion (PCT/ISA/237) dated Oct. 9, 2018, by the Japan Patent Office as the International Searching Authority for International Application No. PCT/JP2018/026506.
Written Opinion of the International Preliminary Examining Authority (PCT/IPEA/408) dated Jul. 2, 2019, by the Japan Patent Office as the International Preliminary Examination Authority for International Application No. PCT/JP2018/026506.
Chinese Office Action dated Sep. 10, 2021 in corresponding CN Application No. 201880032189.9. 25 pages with English Translation.
Office Action dated Aug. 31, 2022, in corresponding Chinese Patent Application No. 201880032189.9. (4 pages).

* cited by examiner

SPECIMEN PREPARATION METHOD AND SPECIMEN PREPARATION DEVICE

CROSS-REFERENCE TO RELATED APPLICATION

This application is a continuation of International Patent Application No. PCT/JP2018/026506 filed on Jul. 13, 2018.

TECHNICAL FIELD

The present invention relates to a specimen preparation method and a specimen preparation device.

BACKGROUND ART

An observation specimen used in a microscope observation or the like is generally prepared by placing an observation object (tissue piece) on a translucent plate (microscope slide). PTL 1 discloses the structure of a specimen preparation device that prepares an observation specimen. This specimen preparation device includes a conveyance belt configured to convey an observation object, and conveys the observation object held on the lower surface of the belt by static electricity. According to PTL 1, transfer of the observation object from the lower surface of the belt onto a plate is done by loosening the belt and bringing the lower surface of the belt into contact with the plate arranged under the belt.

CITATION LIST

Patent Literature

PTL 1: Japanese Patent Laid-Open No. 2008-151657

SUMMARY OF INVENTION

Technical Problem

According to PTL 1, when transferring the observation object, for example, bubbles may be mixed between the observation object and the plate, and the observation specimen may not be appropriately prepared. Additionally, in the structure of PTL 1, a mechanism configured to hold an observation object on the lower surface of the belt by static electricity or release it from the lower surface, a mechanism configured to bring the lower surface of the belt into contact with a plate, and the like are necessary, resulting in a bulky and complex device.

It is an object of the present invention to prepare an observation specimen by transferring an observation object onto a plate without mixture of bubbles by a relatively simple arrangement.

Solution to Problem

According to an aspect of the present invention, there is provided a specimen preparation method of preparing an observation specimen by placing an observation object on a light transmitting plate, comprising a conveyance step of conveying the observation object by a conveyance mechanism including a placement portion configured to form a liquid pool and to place the observation object, and a transfer step of transferring the observation object from the placement portion of the conveyance mechanism onto the plate at a conveyance terminal end of the conveyance mechanism, wherein in the transfer step, a liquid is supplied to the placement portion on which the observation object is placed, and the observation object is carried by a flow of the liquid and transferred onto the plate.

According to another aspect of the present invention, there is provided a specimen preparation device configured to prepare an observation specimen including an observation object placed on a light transmitting plate, comprising a first conveyance unit, including a placement portion configured to form a liquid pool and to place the observation object, for moving the placement portion and conveying the observation object, a second conveyance unit for conveying the plate such that the plate passes a position where the observation object is transferred, and a liquid supply unit for supplying a liquid to the placement portion of the first conveyance unit.

Advantageous Effects of Invention

According to the present invention, it is possible to prepare an observation specimen by transferring an observation object onto a plate without mixture of bubbles.

Other features and advantages of the present invention will be apparent from the following descriptions taken in conjunction with the accompanying drawings, in which like reference characters designate the same or similar parts throughout the figures thereof.

BRIEF DESCRIPTION OF DRAWINGS

The accompanying drawings, which are incorporated in and constitute a part of the specification, illustrate embodiments of the invention and, together with the description, serve to explain the principles of the invention.

DESCRIPTION OF EMBODIMENTS

Figure 1:
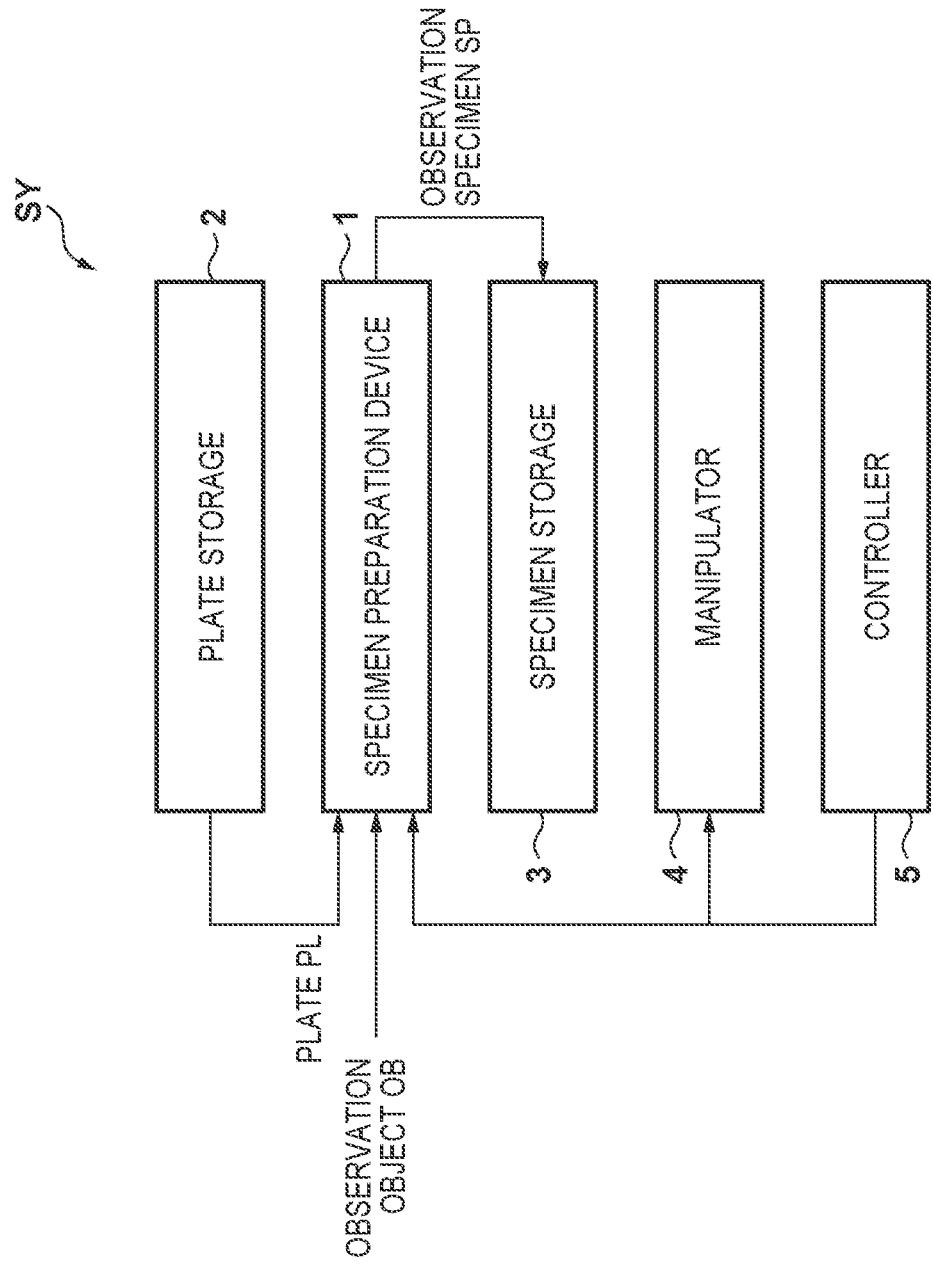
FIG. 1 is a block diagram for explaining an example of the arrangement of a specimen management system.

Embodiments of the present invention will now be described with reference to the accompanying drawings. Note that the drawings are schematic views showing structures or arrangements according to the embodiments, and the dimensions of members shown in the drawings do not necessarily reflect the actuality.

FIG. 1 is a block diagram showing an example of the arrangement of a specimen management system SY according to the embodiment. The specimen management system SY includes a specimen preparation device 1, a plate storage 2, a specimen storage 3, a manipulator 4, and a controller 5.

The specimen preparation device 1 receives an observation object OB that becomes an observation target in a microscope observation or the like, and a light transmitting plate PL used to place the observation object, and places the observation object OB on the plate PL, thereby preparing an observation specimen SP. The observation object OB is a tissue collected from a subject such as a patient, and is typically a sliced tissue piece. The observation specimen SP may be referred to as a tissue specimen or simply as a specimen. The plate PL is a so-called microscope slide, and may be referred to as a placement plate, an optical observation plate, or the like. As another embodiment, a cover glass may further be placed on the plate PL to cover the observation object OB.

The plate storage 2 can store the plate PL provided to the specimen preparation device 1 later. The specimen storage 3 can store the observation specimen SP (that is, the plate PL on which the observation object OB is placed) prepared by the specimen preparation device 1. The manipulator 4 includes a hand (end effector) capable of gripping the plate PL or the observation object OB. By the manipulator 4, the plate PL is transferred from the plate storage 2 to the specimen preparation device 1, and the observation specimen SP is transferred from the specimen preparation device 1 to the specimen storage 3. For example, the manipulator 4 extracts the plate PL from the plate storage 2 and provides it to the specimen preparation device 1, and also receives the observation specimen SP from the specimen preparation device 1 and stores it in the specimen storage 3. As the manipulator 4, for example, a SCARA robot or a vertical 6-axis robot (preferably, a collaborative robot having high collaborative workability with an operator to be described later) can be used.

The controller 5 can control, for example, the operations of the specimen preparation device 1 and the manipulator 4, and can also manage the number of plates PL in stock in the plate storage 2, the number of observation specimens SP stored in the specimen storage 3, and the like. As the controller 5, a semiconductor device such as an ASIC (Application Specific Integrated Circuit) or a PLD (Programmable Logic Device) having a function of performing the control and management can be used. Alternatively, the controller 5 may be formed by a CPU (Central Processing Unit) and a memory, and can perform the control and management by reading out and executing a predetermined program. That is, the function of the controller 5 can be implemented by either hardware or software.

Figure 2:
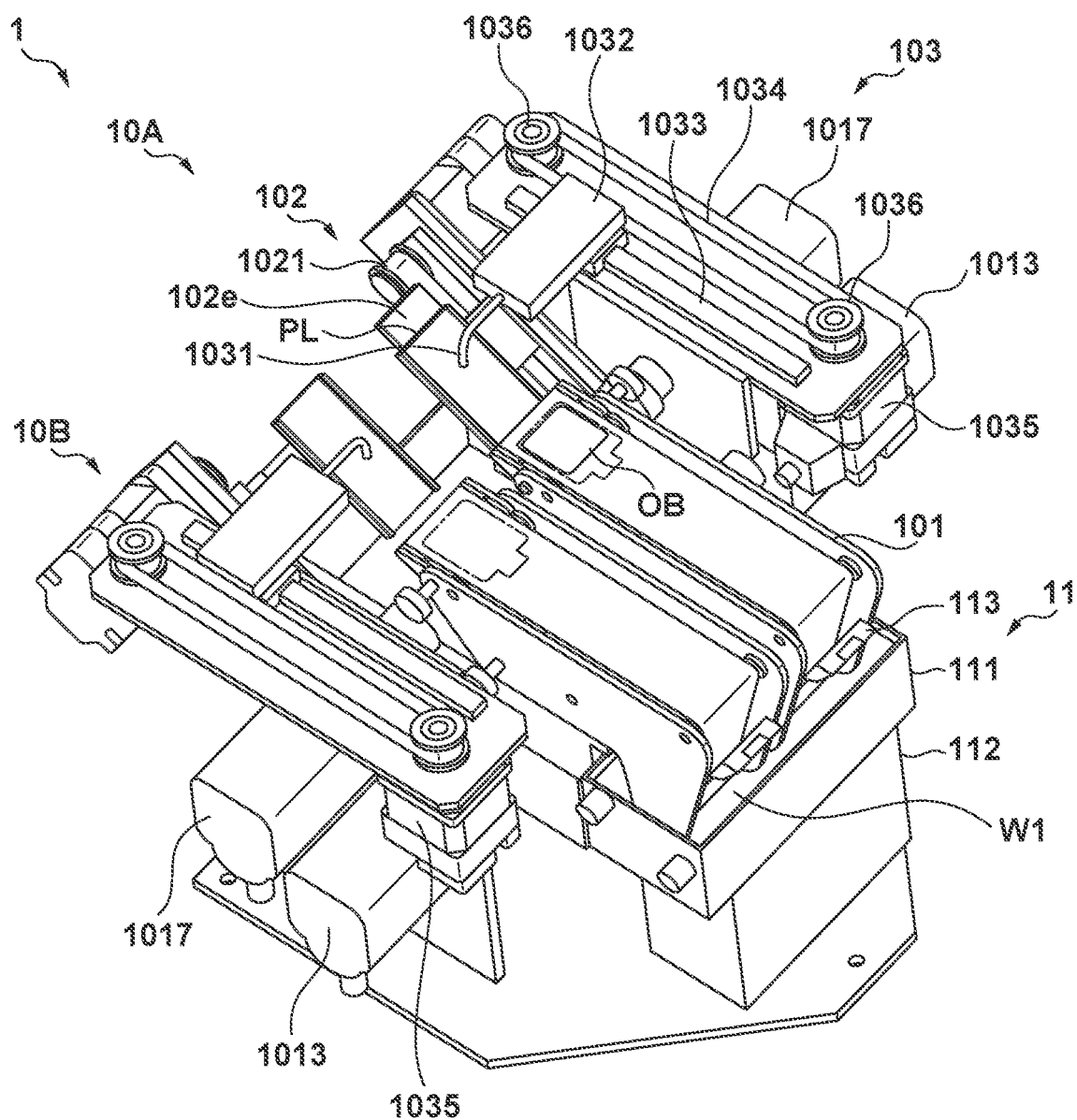
FIG. 2 is a perspective view for explaining an example of the arrangement of a specimen preparation device.

FIG. 2 is a perspective view showing the structure of the specimen preparation device 1. The specimen preparation device 1 includes a pair of transfer units 10A and 10B, and a cleaning unit 11. The transfer unit 10A includes a conveyance unit 101, a conveyance unit 102, and a liquid supply unit 103. The transfer unit 10B is provided to be bilaterally symmetrical to the transfer unit 10A, and has a structure similar to that of the transfer unit 10A. Details of the structure will be described below with focus on the transfer unit 10A.

The conveyance unit 101 can convey the observation object OB placed on the placement surface. In this embodiment, placement of the observation object OB on the placement surface is performed by an operator such as a pathologist using a predetermined tool. As another embodiment, the placement may be done by the manipulator 4, or may be done by another manipulator different from the manipulator 4. In this embodiment, the conveyance unit 101 is a conveyance mechanism (belt mechanism) including a conveyance belt 1011 that forms the placement surface, as will be described later in detail. The surface of the conveyance belt 1011 on the obverse side, that is, the outer surface of the conveyance belt 1011 formed into an annular shape is the placement surface (conveyance surface), and the observation object OB is placed on the placement surface.

The conveyance unit 102 can convey the plate PL placed on the placement surface. In this embodiment, placement of the plate PL on the placement surface is performed by the manipulator 4. However, as another embodiment, the operator may perform the placement. In this embodiment, the conveyance unit 102 includes a placement plate 102e on which the plate PL is placed, as will be described later in detail. The placement plate 102e moves along an oblique direction (the direction of an arrow DI in FIG. 4B to be described later).

The liquid supply unit 103 is configured to be able to supply a liquid to both of the conveyance units 101 and 102 and, in this embodiment, includes a liquid supply nozzle 1031, a slider mechanism 1032, a guiderail 1033, a slider belt 1034, a pair of pulleys 1036, and a motor 1035. The liquid supply nozzle 1031 includes an opening capable of discharging a liquid. In this embodiment, pure water is used as the liquid. As another embodiment, a liquid (a solution or a chemical solution) having no substantial chemical influence on the observation object OB, for example, a physiological saline may be used.

The slider mechanism 1032 fixes the base of the liquid supply nozzle 1031, and is configured to be slidable along the guiderail 1033. In this embodiment, the driving force of the motor 1035 is transmitted to one of the pair of pulleys 1036, whereby the slider belt (timing belt) 1034 stretched between the pair of pulleys 1036 travels. Along with the traveling of the slider belt 1034, the slider mechanism 1032 fixed to the slider belt 1034 is driven. When the slider mechanism 1032 travels along the guiderail 1033, the liquid supply nozzle 1031 reciprocally moves between the conveyance units 101 and 102.

When transferring the observation object OB conveyed by the conveyance unit 101 onto the plate PL conveyed by the conveyance unit 102 (to be sometimes expressed as "transfer of the observation object OB" or simply "transfer" hereinafter), the liquid supply unit 103 supplies a liquid to each of the conveyance units 101 and 102, as will be described later in detail. Note that in this embodiment, the slider belt 1034 is used to transmit the driving force of the motor 1035 to the slider mechanism 1032. However, another linear driving mechanism, for example, a linear motor, a ball screw, a cylinder, a rack and pinion, a chain, or the like may be used.

The cleaning unit 11 is configured to be able to clean the conveyance belt 1011 of the conveyance unit 101 in each of the transfer units 10A and 10B and, in this embodiment, includes a container 111, an ultrasonic generation unit 112, and a supply unit 113, as will be described later in detail. The container 111 includes a storage unit 111a and a liquid discharge unit 111b. The storage unit 111a stores a cleaning liquid W1 that is a liquid used to clean the conveyance belt 1011. The storage unit 111a is connected to a cleaning liquid tank 114 via a supply line 115. The liquid discharge unit 111b temporarily stores the cleaning liquid W1 overflowing from the storage unit 111a and discharges it. The ultrasonic generation unit 112 is arranged on the bottom portion of the container 111, and applies an ultrasonic vibration to the cleaning liquid W1 in the container 111, thereby generating a cavitation in the cleaning liquid W1. In addition, the supply unit 113 supplies a cleaning liquid for finishing to the conveyance belt 1011 cleaned by the cleaning liquid W1.

Figure 3:
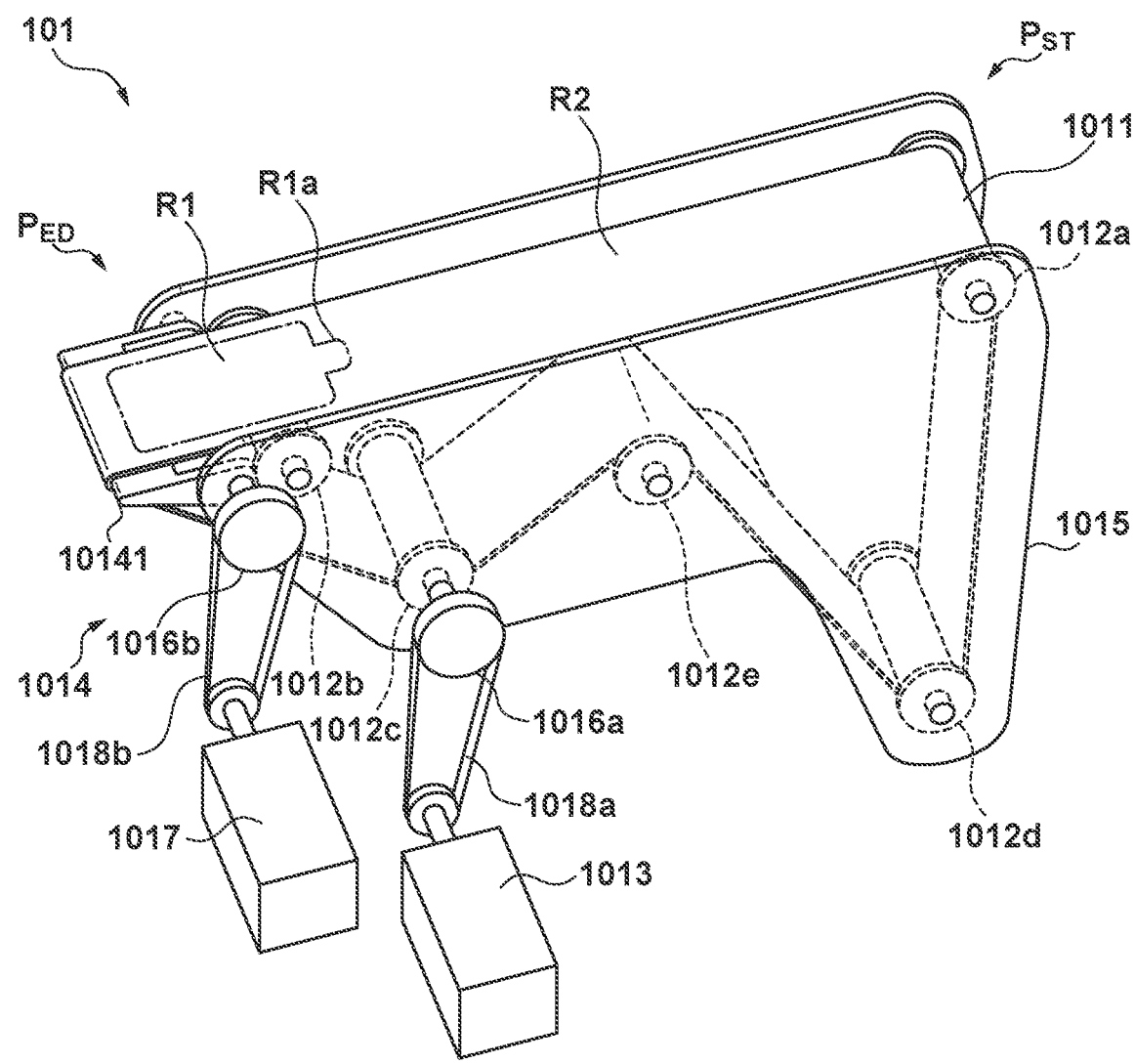
FIG. 3 is a perspective view for explaining a conveyance unit configured to convey an observation object.

FIG. 3 is a perspective view showing the structure of the conveyance unit 101. The conveyance unit 101 includes pulleys 1012a to 1012e, a motor 1013, a tilt mechanism 1014, and a housing 1015 in addition to the above-described conveyance belt 1011. The conveyance belt 1011 is a strip-shaped endless traveling body made of, for example, rubber or the like, and conveys the observation object OB placed on the placement surface, as described above. Note that the conveyance unit 101 shown in FIG. 3 is the conveyance unit 101 of the transfer unit 10B, and has a structure symmetrical to the conveyance unit 101 of the transfer unit 10A.

The conveyance unit 101 is configured to form a folded portion in which the conveyance belt 1011 is folded in a V shape by the pulleys 1012a, 1012d, and 1012e such that a part of the conveyance belt 1011 passes through the cleaning liquid W1 in the container 111, as will be described later in detail. When the conveyance unit 101 and the container 111 are arranged such that the part of the folded portion is immersed in the cleaning liquid W1, the conveyance belt 1011 passing in the container 111 is cleaned by the cavitation in the cleaning liquid W1. Note that the frequency of the ultrasonic wave generated by the ultrasonic generation unit 112 is, for example, about 40 kHz to 170 kHz, but may be changed or adjusted as needed.

With this arrangement, the specimen preparation device 1 sequentially performs preparation of the observation specimen SP and cleaning of the conveyance belt 1011 of the conveyance unit 101 by the cleaning unit 11 in each of the transfer units 10A and 10B. Note that during preparation of the observation specimen SP in one of the transfer units 10A and 10B, cleaning of the conveyance belt 1011 of the conveyance unit 101 and placement or setting of the observation object OB may be performed in the other. However, works of same contents may be performed in both transfer units in parallel.

Referring back to FIG. 3, in this embodiment, the conveyance belt 1011 includes a hydrophilic region R1 and a water repellent region (hydrophobic region) R2 on the upper surface. The hydrophilic region R1 is a region of high wettability, and can retain (or store) a liquid when the liquid is supplied. The water repellent region R2 has a water repellent effect of repelling a liquid when the liquid is supplied.

In this embodiment, the hydrophilic region R1 is surrounded by the water repellent region R2. For this reason, the liquid retained in the hydrophilic region R1 is repelled by the water repellent region R2 toward the center of the hydrophilic region R1 even if the liquid is going to flow outward (in all directions from the hydrophilic region R1 toward the water repellent region R2). Hence, the liquid is continuously retained in the hydrophilic region R1 and forms a liquid pool without spreading out of the hydrophilic region R1. The observation object OB is placed on the liquid pool retained in the hydrophilic region R1. That is, the hydrophilic region R1 corresponds to a placement portion used to place the observation object OB.

The hydrophilic region R1 and the water repellent region R2 can have a relative relationship determined by the difference of the property to the liquid on the upper surface. The hydrophilic region R1 and the water repellent region R2 may be provided such that the contact angle of a liquid droplet on the upper surface satisfies a predetermined condition. For example, letting $\theta w$ be the contact angle of a liquid droplet of pure water, the hydrophilic region R1 preferably satisfies at least a super-hydrophilicity represented by $\theta w \geq 10°$, and more preferably, $\theta w \leq 5°$. The water repellent region R2 is preferably provided such that the contact angle $\theta w$ in the water repellent region R2 becomes larger than at least the contact angle $\theta w$ in the hydrophilic region R1. The water repellent region R2 preferably satisfies a water repellency represented by $\theta w \geq 90°$, more preferably, a high water repellency represented by $\theta w \geq 120°$, and much more preferably, a super water repellency represented by $\theta w \geq 150°$.

In this embodiment, the hydrophilic region R1 is provided in an almost rectangular shape at the center of the conveyance belt 1011 in the widthwise direction (the direction orthogonal to the conveyance direction of the conveyance belt 1011), and the water repellent region R2 is formed at two ends. In addition, two or more hydrophilic regions R1 may be provided in the conveyance direction of the conveyance belt 1011. For example, in a case in which two hydrophilic regions R1 are provided on the upper surface of the conveyance belt 1011, when one of them is being used to transfer the observation object OB, the other can be cleaned by the cleaning unit 11. The hydrophilic region R1 includes a portion R1a formed into a convex shape on the upstream side of the conveyance direction, as will be described later in detail.

The hydrophilic region R1 is formed, for example, in the following way. First, the conveyance belt 1011 itself is formed using a hydrophilic material. After that, an evaporated film, a coat, or a film of a water repellent material is provided on a portion of the surface of the conveyance belt 1011 other than the hydrophilic region R1, in other words, a portion that surrounds the hydrophilic region R1, thereby forming the water repellent region R2. The hydrophilic region R1 may be formed in the following way. First, the surface of a desired region of the conveyance belt 1011 made of a common belt material is coated with a titanium oxide film. After that, the coating region of the titanium oxide film is irradiated with ultraviolet rays, thereby forming the irradiated region into the hydrophilic region R1.

On the other hand, the water repellent region R2 may be formed, for example, in the following way. First, the conveyance belt 1011 itself is formed using a water repellent material. After that, the surface of a desired region of the conveyance belt 1011 is coated with a titanium oxide film, the coating region of the titanium oxide film is irradiated with ultraviolet rays, thereby forming the irradiated region into the hydrophilic region R1. The whole region other than the hydrophilic region R1 is the water repellent region R2. The water repellent region R2 may be formed in the following way. A surface roughening film body (a film body with a number of extra-fine projecting portions on the surface) transferred by a nanoimprinting method is pasted to a portion surrounding the hydrophilic region R1 on the surface of the conveyance belt 1011. In addition, the film body is coated with a low surface energy substance, or a low surface energy material is mixed or polymerized in the film body itself, thereby forming the film body into the water repellent region R2.

The pulleys 1012a to 1012e are arranged to allow the conveyance belt 1011 to travel, and fix the position of the conveyance belt 1011. The pulley 1012a is arranged on the side of a conveyance start end $P_{ST}$ of the conveyance belt 1011, that is, on the upstream side (the right side in FIG. 3) of the conveyance direction of the conveyance belt 1011. The pulley 1012b is arranged on the side of a conveyance terminal end $P_{ED}$ of the belt 1011, that is, on the downstream side (the left side in FIG. 3) of the conveyance direction of the belt 1011. The pulleys 1012c to 1012e are arranged to guide the conveyance belt 1011 that has ended the conveyance of the observation object OB at the conveyance terminal end $P_{ED}$ to the side of the conveyance terminal end $P_{ED}$ again.

In this embodiment, the pulley 1012c is arranged on the lower side of the conveyance terminal end $P_{ED}$, and the pulley 1012d is arranged on the lower side of the conveyance start end $P_{ST}$. The pulley 1012e is arranged between the pulleys 1012c and 1012d on the upper side of them. By such an arrangement of the pulleys 1012a to 1012e, the conveyance belt 1011 that has ended the conveyance at the conveyance terminal end $P_{ED}$ readily passes through the above-described cleaning unit 11.

In this embodiment, the motor 1013 is arranged on the lower side of the pulley 1012c and a pulley 1016a on the same axis as that, and the driving force of the motor 1013 is transmitted to the pulley 1016a via a toothed belt (timing belt) 1018a. The rotation of the pulley 1016a is directly input to the pulley 1012c. When the pulley 1012c receives the driving force from the motor 1013 and thus rotates, the conveyance belt 1011 travels. In this embodiment, the motor 1013 is arranged on the lower side of the pulley 1012c. As another embodiment, the motor 1013 may be arranged on the lower side of another pulley, for example, the pulley 1012b.

The tilt mechanism 1014 is configured to be able to tilt the conveyance terminal end $P_{ED}$ and, in this embodiment, includes a guide portion 10141 and a motor 1017. The driving force of the motor 1017 is transmitted to a pulley 1016b via a toothed belt (timing belt) 1018b. The pulley 1016b is rigidly connected to the guide portion 10141, and the rotation of the pulley 1016b is directly input to the guide portion 10141. This allows the guide portion 10141 to receive the driving force from the motor 1017 and tilt. In other words, the pivotal motion of the motor 1017 is converted into the tilting motion of the guide portion 10141.

With this arrangement, the tilt mechanism 1014 can make the upper surface of the conveyance belt 1011 level/flat entirely from the conveyance start end $P_{ST}$ to the conveyance terminal end $P_{ED}$, or can bend the conveyance terminal end $P_{ED}$ downward with respect to the conveyance start end $P_{ST}$. Note that a small roller may be provided at the distal end of the guide portion 10141 such that the conveyance belt 1011 readily travels. Alternatively, to reduce the frictional resistance between the guide portion 10141 and the conveyance belt 1011, they may be configured as follows. That is, at least the distal end surface of the guide portion 10141 is covered with a material of a low frictional resistance, the lower surface of the conveyance belt 1011 is covered with a material of a low frictional resistance, or the guide portion 10141 itself is made of a material of a low frictional resistance.

In this specification, tilt means a posture or state in which a tilt occurs with respect to a level surface. In this embodiment, the tilt of the conveyance terminal end $P_{ED}$ is implemented by bending the conveyance terminal end $P_{ED}$ downward with respect to the conveyance start end $P_{ST}$ by the tilt mechanism 1014. The conveyance terminal end $P_{ED}$ can freely be moved close to or far away from the conveyance unit 102 by the tilt mechanism 1014, as will be described later in detail.

A pair of housings 1015 are arranged to sandwich the conveyance belt 1011, the pulleys 1012a to 1012e, and the tilt mechanism 1014. By the pair of housings 1015, the pulleys 1012a to 1012e and the tilt mechanism 1014 are supported, and the conveyance belt 1011 can be made to travel stably. In addition, the pair of housings 1015 are provided such that the upper end of each of them is located above the upper traveling surface of the conveyance belt 1011. This prevents the observation object OB conveyed by the conveyance belt 1011 from falling from both sides of the belt during conveyance.

A form of a specimen preparation method according to this embodiment will be described below with reference to FIGS. 4A to 12B. As the outline of the method, when transferring the observation object OB conveyed by the conveyance unit 101 onto the plate PL conveyed by the conveyance unit 102, a liquid is supplied to the conveyance unit 101 by the liquid supply nozzle 1031. Then, the observation object OB is transferred onto the plate PL together with the liquid.

Figure 4A:
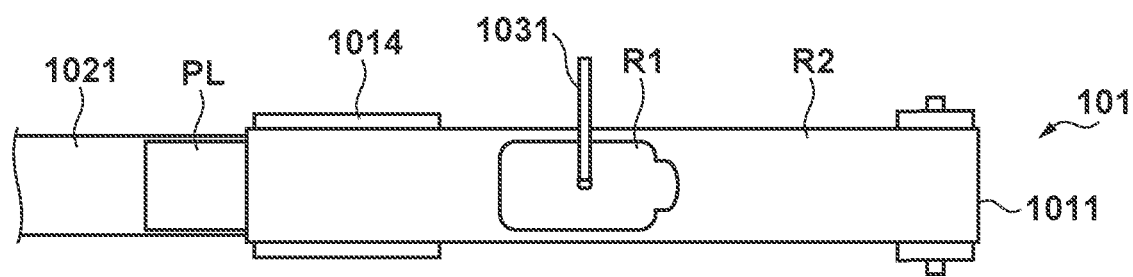
FIG. 4A is a view for explaining part of a specimen preparation form by the specimen preparation device.
Figure 4B:
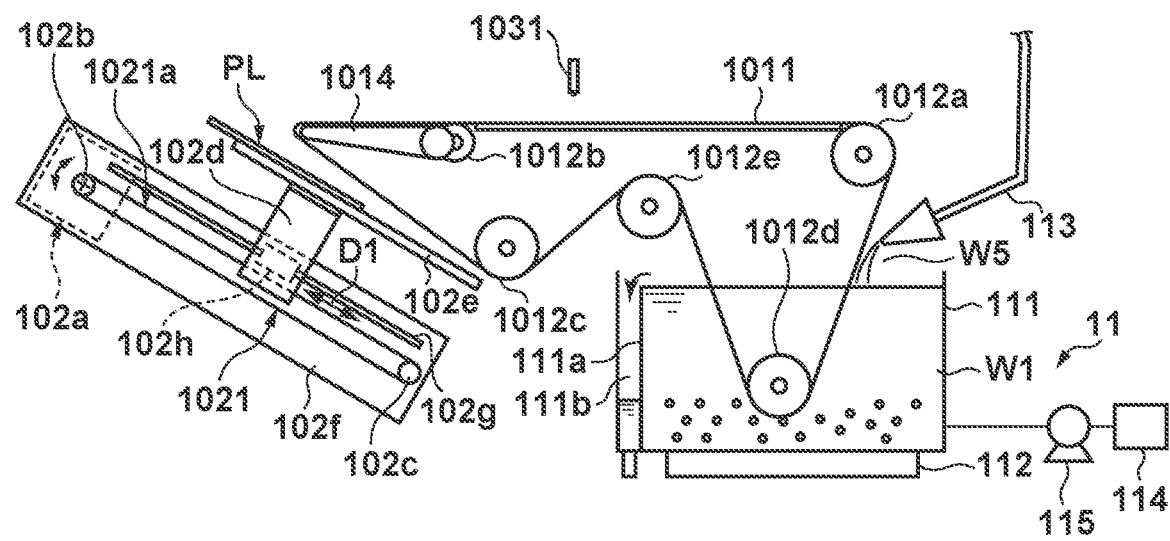
FIG. 4B is a view for explaining part of the specimen preparation form by the specimen preparation device.

First, in a process shown in FIGS. 4A and 4B, the plate PL is set in the conveyance unit 102. FIG. 4A shows a plan view of the conveyance unit 101, and FIG. 4B shows a side view of the conveyance unit 101 together with the conveyance unit 102. Note that the views (FIGS. 5A and 5B and subsequent views) for explaining the contents after this process also show a plan view and a side view.

Here, as shown in FIG. 4B, (partially shown in FIG. 2 as well), the conveyance unit 102 includes a driving motor 102a, a driving pulley 102b, a driven pulley 102c, a conveyance belt 1021, a bracket 102d, a placement plate 102e, a support member 102f, and a guide member 102g. The driving motor 102a is attached to a side surface of the support member 102f on one side, and the driving pulley 102b and the driven pulley 102c are attached to a side surface on the other side. The conveyance belt 1021 is stretched between the driving pulley 102b and the driven pulley 102c. The bracket 102d is a Z-shaped (crank-shaped) member, and has one end fixed to an upper traveling portion 1021a of the conveyance belt 1021. The placement plate 102e is provided on the other end.

The guide member 102g is provided along the direction DI on the side surface of the support member 102f on the other side (the side surface to which the driving pulley 102b and the driven pulley 102c are attached). A surface of the bracket 102d facing the support member 102f is provided with a slider 102h that is slidable along the guide member 102g.

According to this arrangement, when the driving pulley 102b receives a driving force from the driving motor 102a and rotates, the conveyance belt 1021 travels. The slider 102*h* on the bracket 102*d* thus slides along the guide member 102*g*, and the placement plate 102*e* moves along the direction DI.

Note that in this process, the tilt mechanism 1014 is assumed to maintain the upper surface of the conveyance belt 1011 entirely from the conveyance start end $P_{ST}$ to the conveyance terminal end $P_{ED}$ (see FIG. 3) in a state in which the upper surface is level (to be sometimes simply expressed as a "level state" hereinafter).

Figure 5A:
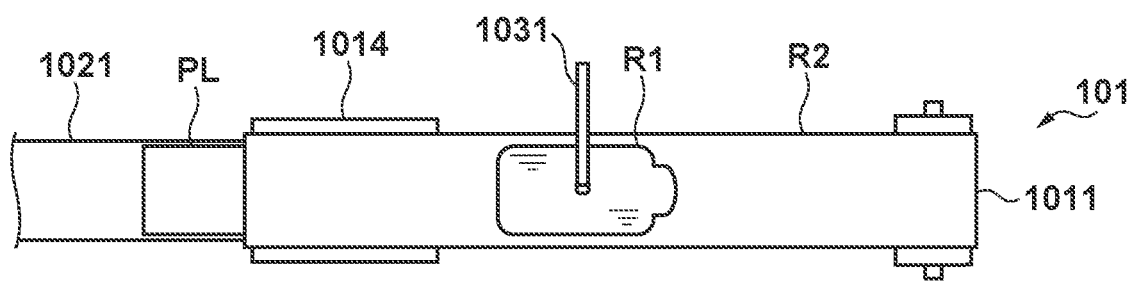
FIG. 5A is a view for explaining part of the specimen preparation form by the specimen preparation device.
Figure 5B:
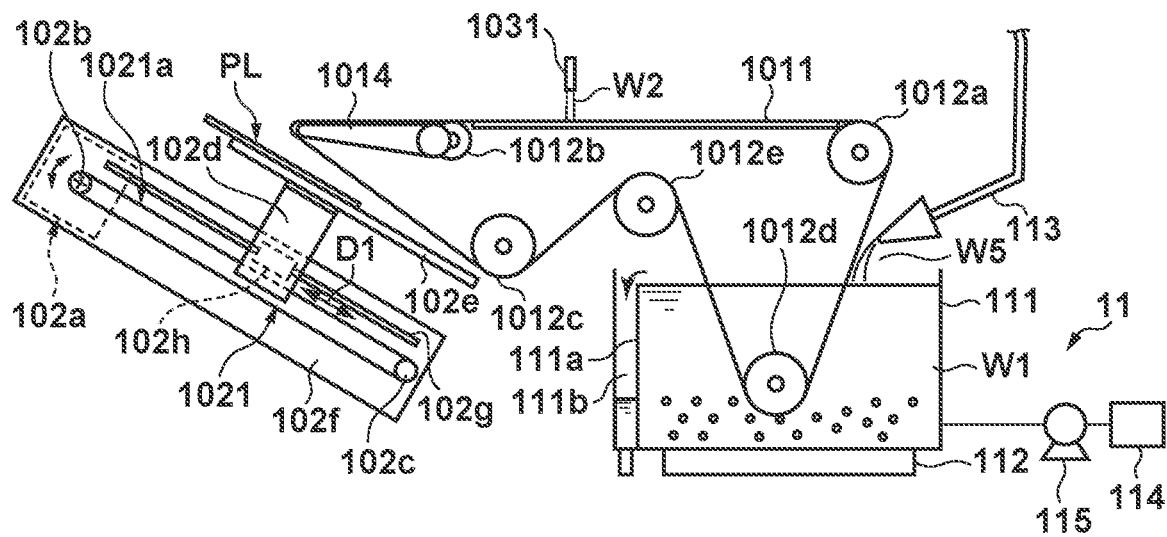
FIG. 5B is a view for explaining part of the specimen preparation form by the specimen preparation device.

Next, in a process shown in FIGS. 5A and 5B, a liquid W2 is supplied, by the liquid supply nozzle 1031, to the hydrophilic region R1 on the conveyance belt 1011 of the conveyance unit 101. As described above, the hydrophilic region R1 is surrounded by the water repellent region R2. Hence, the supplied liquid W2 is retained in the hydrophilic region R1 and forms a liquid pool, as shown in FIG. 5A.

Figure 6A:
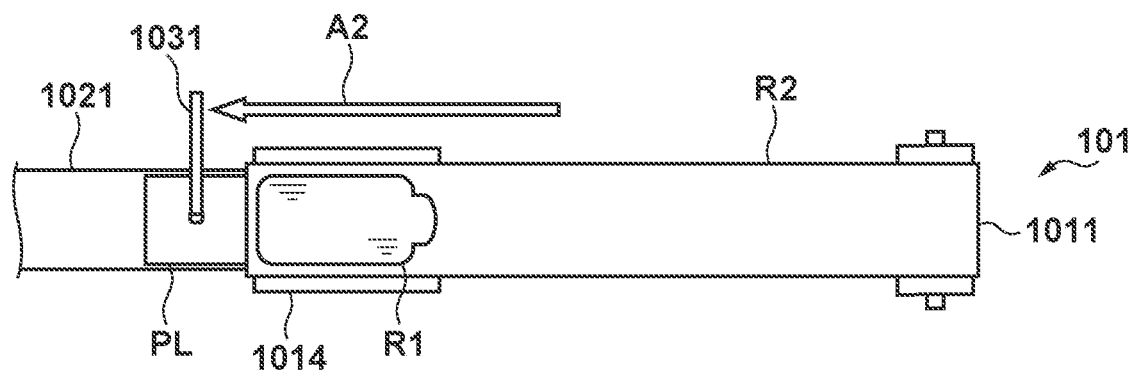
FIG. 6A is a view for explaining part of the specimen preparation form by the specimen preparation device.
Figure 6B:
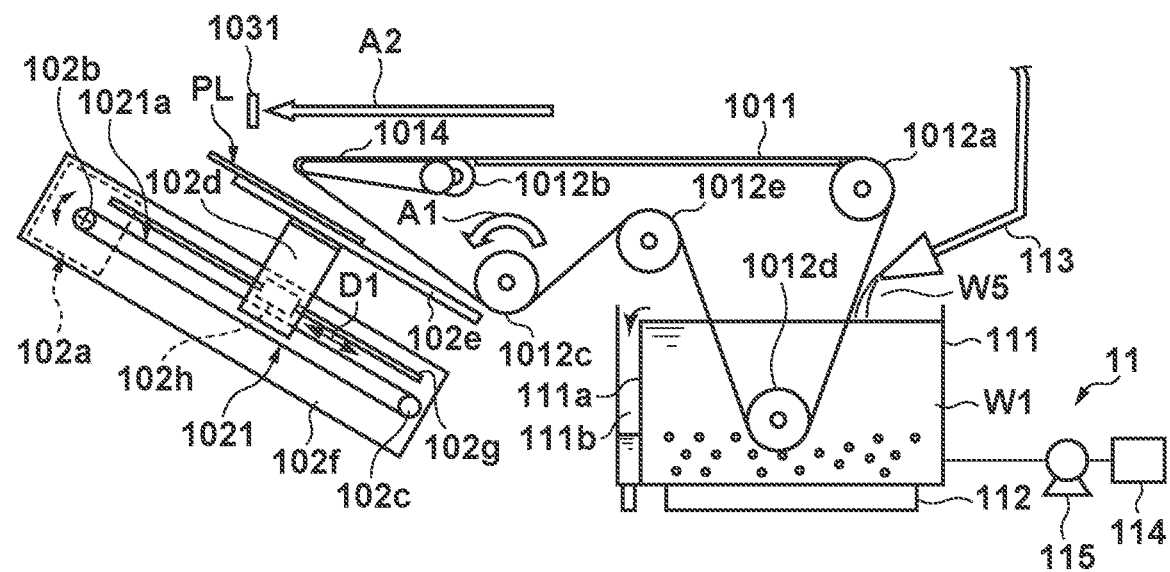
FIG. 6B is a view for explaining part of the specimen preparation form by the specimen preparation device.

Next, the motor 1013 shown in FIG. 2 is driven to rotate the pulley 1012*c* in a direction indicated by an arrow A1 in FIG. 6B. Accordingly, the conveyance belt 1011 travels in a direction indicated by an arrow A2, and the hydrophilic region R1 moves to the side of the conveyance terminal end $P_{ED}$ together with the liquid pool retained on it. When the hydrophilic region R1 moves to the side of the conveyance terminal end $P_{ED}$, the driving of the motor 1013 is stopped. Almost at the same time as the moving process of the hydrophilic region R1, the liquid supply nozzle 1031 is moved in the direction indicated by the arrow A2 in FIGS. 6A and 6B and stopped above the plate PL in the conveyance unit 102.

Note that in this specification, concerning "almost at the same time", two processes are preferably performed in parallel. However, the periods in which the processes are performed may partially overlap, or the other process may be performed in a relatively short time from one process. For example, in the process shown in FIGS. 6A and 6B, the movement of the hydrophilic region R1 and the movement of the liquid supply nozzle 1031 are performed in parallel, performed partially in the same period, or performed sequentially in a relatively short time.

Figure 7A:
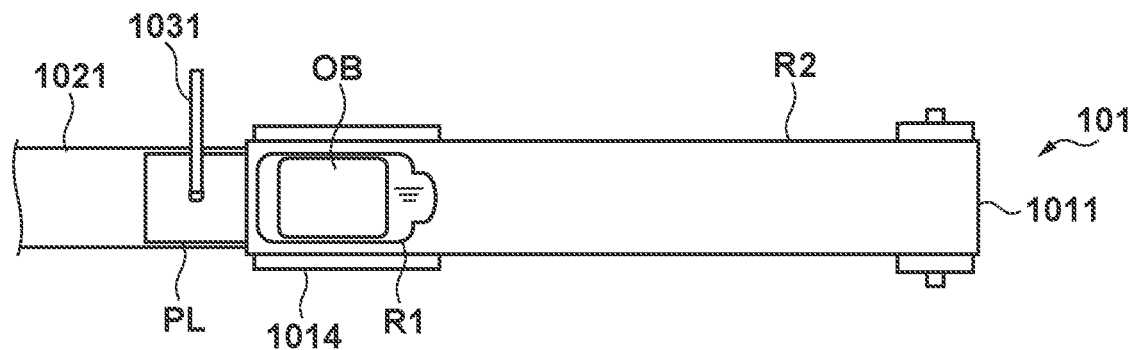
FIG. 7A is a view for explaining part of the specimen preparation form by the specimen preparation device.
Figure 7B:
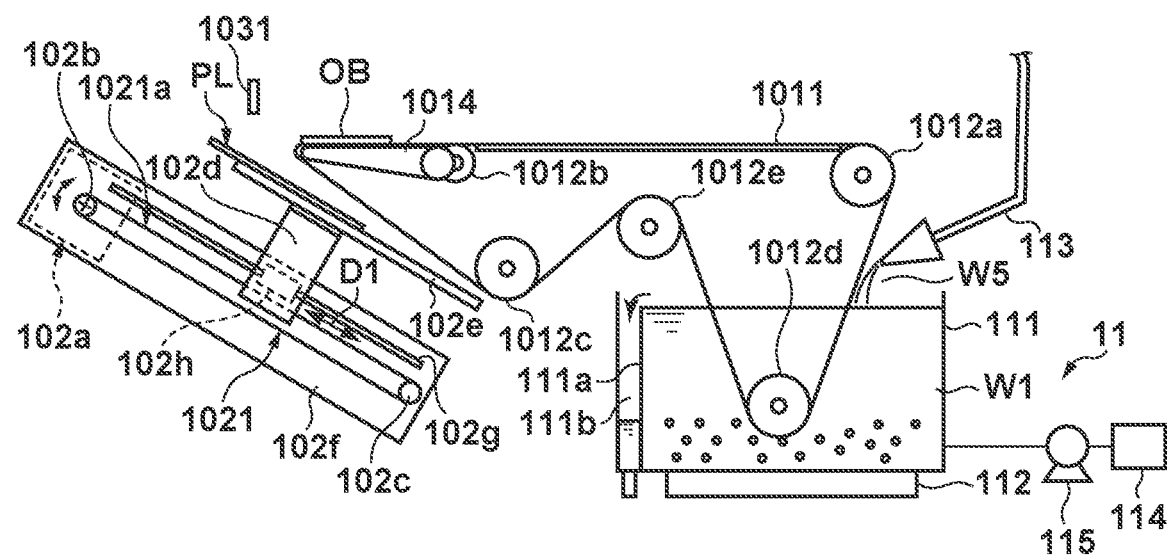
FIG. 7B is a view for explaining part of the specimen preparation form by the specimen preparation device.

Next, in a process shown in FIGS. 7A and 7B, the observation object OB is placed on the liquid pool of the liquid W2 retained in the hydrophilic region R1. At this time, since the hydrophilic region R1 is surrounded by the water repellent region R2, the liquid pool is stably maintained on the hydrophilic region R1. At this time, an interfacial tension acts between the hydrophilic region R1 (placement portion) and the water repellent region R2 (hydrophobic portion). By the interfacial tension, a force of pulling to the center of the liquid pool surface acts on the observation object OB. Accordingly, the observation object OB is maintained in a state in which it is always centered toward the center of the liquid pool surface. For this reason, displacement of the observation object OB hardly occurs on the liquid pool. Even if the observation object OB is displaced by the tilt of the conveyance belt 1011 or a vibration generated at the time of traveling of the conveyance belt 1011, the observation object OB is immediately held at the center of the surface of the liquid pool because it is always centered toward the center of the liquid pool surface. Here, if bubbles are mixed between the observation object OB and the liquid pool when the observation object OB is placed on the liquid pool, the bubbles are preferably squeezed out at this point of time.

Figure 8A:
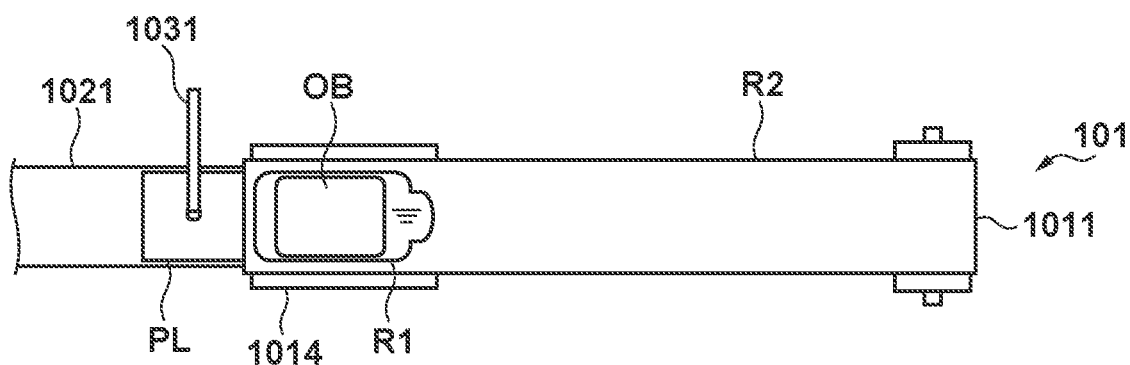
FIG. 8A is a view for explaining part of the specimen preparation form by the specimen preparation device.
Figure 8B:
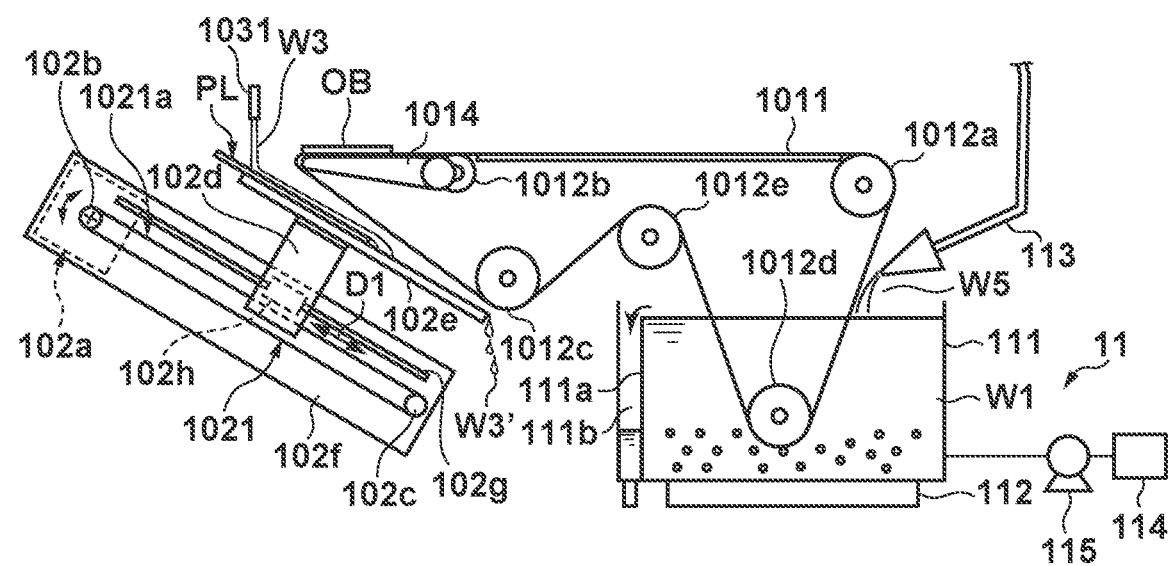
FIG. 8B is a view for explaining part of the specimen preparation form by the specimen preparation device.

Next, in a process shown in FIGS. 8A and 8B, a liquid W3 is supplied, by the liquid supply nozzle 1031, to the plate PL in the conveyance unit 102 to make the upper surface of the plate PL wet. Here, as is apparent from FIG. 8B, the conveyance unit 102 is provided such that the plate PL is in a tilting posture. Hence, an excess W3' of the supplied liquid W3 drops downward.

Figure 9A:
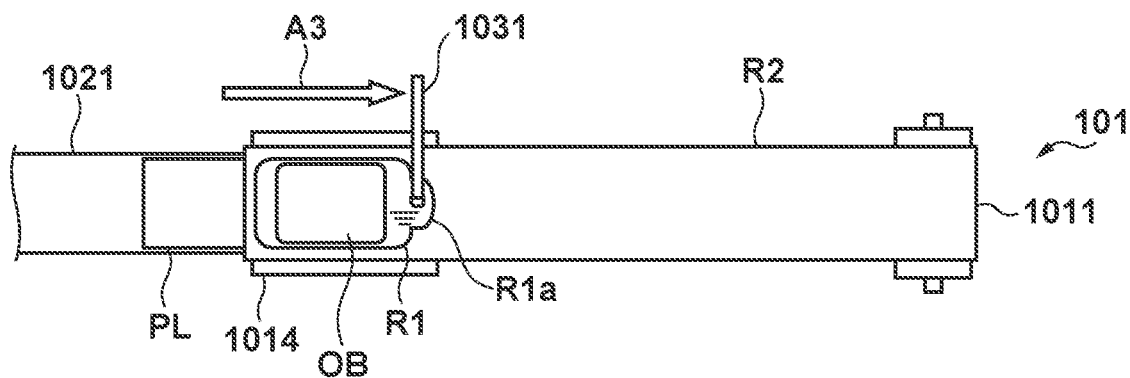
FIG. 9A is a view for explaining part of the specimen preparation form by the specimen preparation device.
Figure 9B:
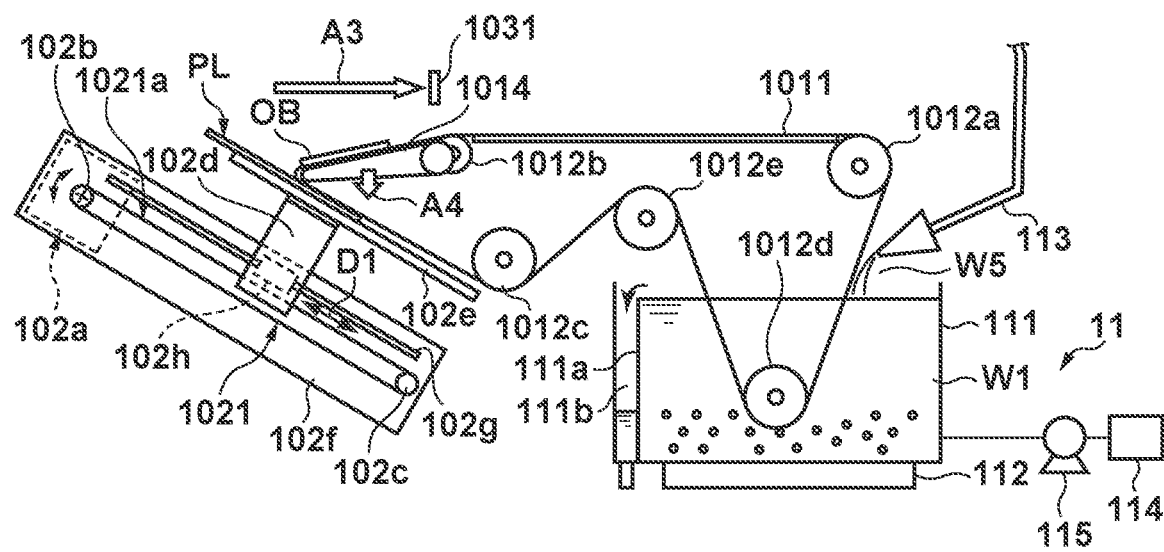
FIG. 9B is a view for explaining part of the specimen preparation form by the specimen preparation device.

Next, in a process shown in FIGS. 9A and 9B, the liquid supply nozzle 1031 is moved in a direction indicated by an arrow A3 in FIGS. 9A and 9B and stopped above the convex portion R1*a* of the hydrophilic region R1. Almost at the same time as the moving process of the liquid supply nozzle 1031, the tilt mechanism 1014 is driven to bend the conveyance terminal end $P_{ED}$ in a direction indicated by an arrow A4 in FIG. 9B to set the conveyance terminal end $P_{ED}$ in a state in which it tilts (to be sometimes simply expressed as a "tilt state" hereinafter) and bring the conveyance terminal end $P_{ED}$ close to the plate PL in the conveyance unit 102.

Figure 10A:
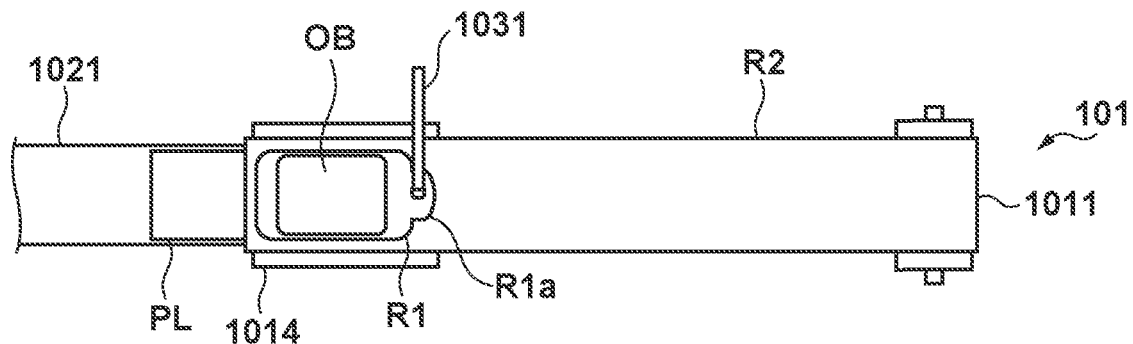
FIG. 10A is a view for explaining part of the specimen preparation form by the specimen preparation device.
Figure 10B:
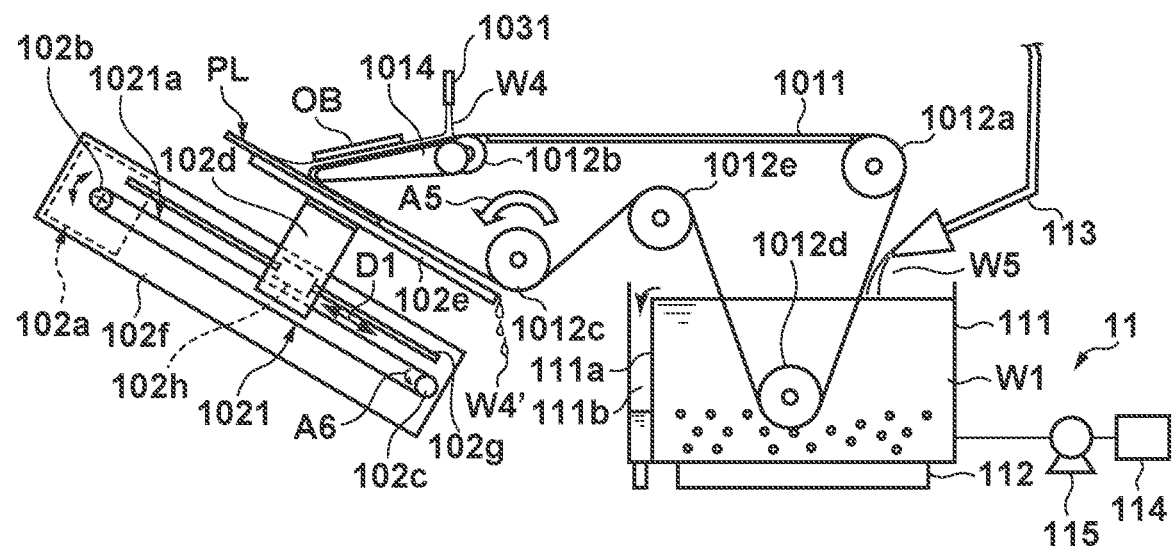
FIG. 10B is a view for explaining part of the specimen preparation form by the specimen preparation device.

Next, in a process shown in FIGS. 10A and 10B, the motor 1013 is driven again to rotate the pulley 1012*c* in a direction indicated by an arrow A5 in FIG. 10B and make the belt 1011 travel. Accordingly, the observation object OB on the liquid pool retained in the hydrophilic region R1 is conveyed to the side of the conveyance unit 102 close to the conveyance terminal end $P_{ED}$. Almost at the same time as the conveyance process of the observation object OB, the motor 102*a* is driven to make the conveyance belt 1021 travel. Accordingly, the plate PL moves obliquely upward along the direction of the arrow DI. Additionally, almost at the same time as the conveyance process of the plate PL, a liquid W4 is supplied to the portion R1*a* of the hydrophilic region R1 by the liquid supply nozzle 1031.

That is, in the transfer process of the observation object OB shown in FIGS. 10A and 10B, three operations, that is, the conveyance of the observation object OB by the conveyance unit 101, the conveyance of the plate PL by the conveyance unit 102, and the supply of the liquid W4 on the upstream side of the observation object OB are performed in parallel. The three operations are preferably executed in parallel/in a superimposed manner at least for a predetermined period. However, the start and/or end timings of the operations need not always match.

Note that since the conveyance unit 102 is provided such that the plate PL is in a tilting posture, an excess W4' of the supplied liquid W4 drops downward in this process as well.

Figure 11A:
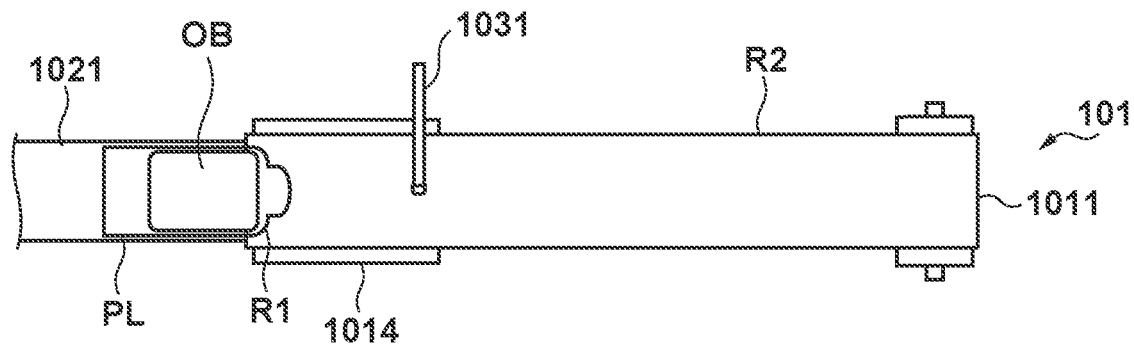
FIG. 11A is a view for explaining part of the specimen preparation form by the specimen preparation device.
Figure 11B:
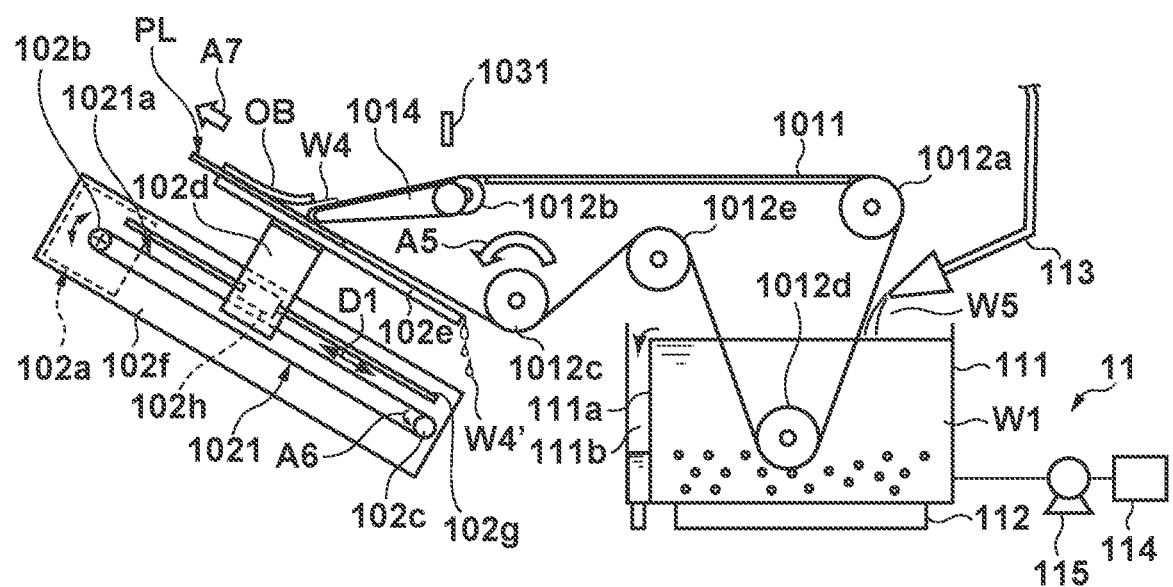
FIG. 11B is a view for explaining part of the specimen preparation form by the specimen preparation device.

In a process shown in FIGS. 11A and 11B, while the conveyance of the observation object OB by the conveyance unit 101 and the conveyance of the plate PL by the conveyance unit 102 are continuously performed, the observation object OB is placed on the flow of the supplied liquid W4. The observation object OB is transferred onto the plate PL together with the liquid W4. In another expression, the observation object OB is washed away by the liquid W4 onto the plate PL together with the liquid pool.

In this process, the plate PL is transferred upward along a direction indicted by an arrow A7 in FIG. 11B, that is, the direction of tilt of the placement plate 102*e*. For this reason, when carried (dropped) from the conveyance belt 1011 of the conveyance unit 101 at the conveyance terminal end $P_{ED}$, the observation object OB is placed on the plate PL and appropriately transferred onto the plate PL together with the liquid pool and the liquid W4 without mixing bubbles in the observation object OB. The observation object OB is thus transferred onto the plate PL, and the observation specimen SP is prepared. Note that the excess W4' of the liquid W4 flowing onto the plate PL together with the observation object OB drops downward along the placement plate 102*e* of the conveyance unit 102.

Figure 12A:
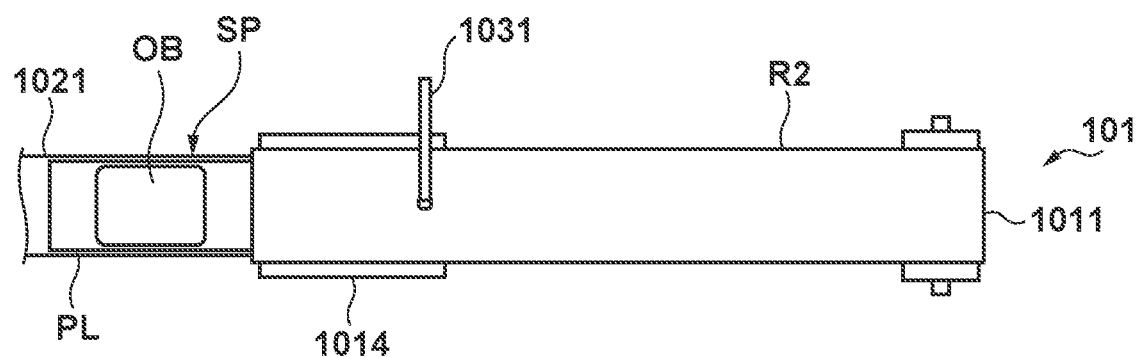
FIG. 12A is a view for explaining part of the specimen preparation form by the specimen preparation device.
Figure 12B:
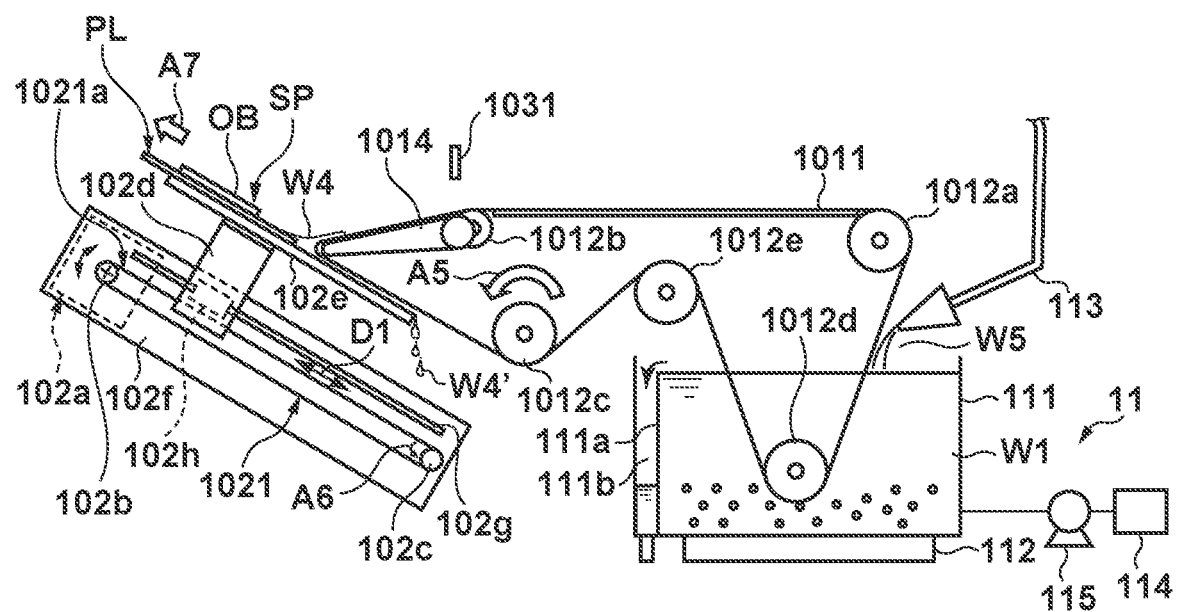
FIG. 12B is a view for explaining part of the specimen preparation form by the specimen preparation device.

In a process shown in FIGS. 12A and 12B, the placement plate 102*e* with the observation specimen SP is transferred by the conveyance unit 102 in the direction indicated by the arrow A7 in FIG. 11B and then stopped at a position where the above-described manipulator 4 (see FIG. 1) can grip the observation specimen SP. The stop position is located at the upper end of the guide member 102g, and may be called an upper stop position, an upper stop point, or the like. After that, the manipulator 4 grips the observation specimen SP, extracts it from the placement plate 102e, and stores it in the specimen storage 3.

Additionally, in this process, even after the observation object OB is released from the conveyance belt 1011 of the conveyance unit 101, that is, even after the observation object OB is transferred onto the plate PL, the conveyance belt 1011 is continuously made to travel and guided into the storage unit 111a of the cleaning unit 11. The conveyance belt 1011 is thus cleaned by the cleaning liquid W1 in the storage unit 111a so as to be in a state in which the next (another) observation object OB can be placed in the hydrophilic region R1.

As is apparent from the side views of FIGS. 5B, 6B, 7B, 8B, 9B, 10B, 11B, and 12B, since the pulleys 1012a and 1012e are located above the container 111, and the pulley 1012d is located in the container 111, the belt 1011 passes through the cleaning liquid W1 in the storage unit 111a. As described above, the conveyance unit 101 is configured to form a folded portion in which the conveyance belt 1011 is folded in a V shape by the pulleys 1012a, 1012d, and 1012e. That is, the conveyance belt 1011 includes a portion (first traveling portion) that travels downward from the pulley 1012e to the pulley 1012d to pass through the storage unit 111a and a portion (second traveling portion) that is folded from this portion and travels upward from the pulley 1012d to the pulley 1012a.

The conveyance belt 1011 can thus pass through the cleaning liquid W1 in the storage unit 111a. When the conveyance belt 1011 passes through the cleaning liquid W1, ultrasonic cleaning by the ultrasonic generation unit 112 is performed for the conveyance belt 1011. Adhered substances such as protein and contamination adhered to the conveyance belt 1011 are peeled off by a cavitation or the like generated by the ultrasonic vibration and float on the surface of the cleaning liquid W1. When the cleaning liquid W1 is sufficiently supplied from the cleaning liquid tank 114, the cleaning liquid W1 in the storage unit 111a overflows. Along with the overflow of the cleaning liquid W1, the adhered substances floating on the surface of the cleaning liquid W1 are discharged to the liquid discharge unit 111b. As a result, the cleaning liquid W1 stored in the storage unit 111a is kept clean.

A cleaning liquid (an unused cleaning liquid or a cleaning liquid after the cleaning process) W5 for finishing is supplied from the supply unit 113 to the conveyance belt 1011 that has passed through the cleaning liquid W1 in the storage unit 111a. The cleaning liquid W1 adhered to the surface of the conveyance belt 1011 is thus washed away by the cleaning liquid W5 for finishing. In this embodiment, since the supply unit 113 is located above the container 111, the cleaning liquid W5 supplied from the supply unit 113 to the conveyance belt 1011 directly drops into the container 111 and is stored as the relatively clean cleaning liquid W1 in the container 111. Note that the cleaning liquid W1 and the liquids W2 to W4 are pure water in this embodiment, but some/all of them may be solutions different from each other. In addition, the cleaning liquid W5 for finishing may be the same liquid as the liquids W2 to W4.

The observation specimen SP using the observation object OB is prepared in the above-described way. To prepare another observation specimen SP using another observation object OB after that, the tilt mechanism 1014 is driven to return the conveyance terminal end $P_{ED}$ to the level state, and the processes shown in FIGS. 5A and 5B to 12A and 12B are performed for the next observation object OB in a similar manner.

According to this embodiment, the observation object OB conveyed by the conveyance unit 101 can appropriately be transferred onto the plate PL conveyed by the conveyance unit 102. More specifically, as described with reference to FIGS. 10A to 11B, at the time of transfer, the liquid W4 is supplied to the conveyance unit 101 by the liquid supply nozzle 1031, and the observation object OB is transferred onto the plate PL together with the liquid W4. At this time, the observation object OB is carried by the flow of the liquid W4, and is thus released from the conveyance unit 101 and transferred onto the plate PL. According to this embodiment, the observation object OB is washed away by the liquid W4, thereby implementing transfer of the observation object OB onto the plate PL without mixing bubbles between the observation object OB and the plate PL.

In this embodiment, before the transfer of the observation object OB, the observation object OB is placed on the liquid pool of the liquid W2 retained in the hydrophilic region R1 in the conveyance unit 101. Hence, when transferring the observation object OB, the liquid pool assists or promotes the wash-away of the observation object OB by the supplied liquid W4. That is, when the liquid W4 is further supplied to the hydrophilic region R1, the observation object OB on the liquid pool retained in the hydrophilic region R1 is washed away together with the liquid pool and the liquid W4 and thus moved onto the plate PL. Here, if bubbles are mixed between the liquid pool and the observation object OB when transferring the observation object OB onto the liquid pool, the bubbles are squeezed out in advance before the transfer of the observation object OB (that is, before the supply of the liquid W4), thereby preventing the bubbles from being mixed between the observation object OB and the plate PL at the time of transfer.

Here, the liquid pool and the liquid W4 which are moved onto the plate PL when transferring the observation object OB, and the liquid W3 supplied onto the plate PL in advance flow downward due to the water repellency of the plate PL and the tilt of the plate PL itself. When the liquid pool and the liquids W3 and W4 flow downward, air is not mixed between the observation object OB and the plate PL. Hence, the observation object OB comes into tight contact with the plate PL. The liquid pool and the liquids W3 and W4 need not completely flow downward from the plate PL, and liquids in such an amount that makes the upper surface of the plate PL wet may remain.

Additionally, according to this embodiment, since the conveyance terminal end $P_{ED}$ of the conveyance unit 101 is in the tilting state, the observation object OB can readily be carried by the flow of the liquid W4. In addition, when the conveyance terminal end $P_{ED}$ is in the tilting state, the clearance between the plate PL and the conveyance terminal end $P_{ED}$ can be made small, and the fall distance of the observation object OB released from the conveyance terminal end $P_{ED}$ can be made short. This makes it possible to, at the time of transfer of the observation object OB, transfer the observation object OB while substantially keeping it in a level state. That is, it is possible to prevent the posture of the observation object OB from changing and more appropriately transfer the observation object OB.

Let $\theta 1$ be the tilt angle of the conveyance terminal end $P_{ED}$ (the angle made by the level surface and the upper surface of the conveyance terminal end $P_{ED}$). If θ1 is made too large, the posture of the observation object OB may change when transferring the observation object OB. For this reason, for example, the tilt angle θ1 is set to 5°<θ1<30° (preferably 5°<θ1<20°) approximately.

The conveyance terminal end $P_{ED}$ and the plate PL need only be apart to such an extent not to impede traveling of the conveyance belts 1011 and 1021 of the conveyance units 101 and 102. For example, the clearance between the plate PL and the conveyance terminal end $P_{ED}$ need only be at least less than the size of the observation object OB, and is preferably a half or less of the size of the observation object OB.

Here, in this embodiment, a form in which the conveyance terminal end $P_{ED}$ is set in the tilting state and brought close to the conveyance unit 102 has been described. However, the present invention is not limited to this. That is, at least one of the conveyance unit 101 (especially the conveyance terminal end $P_{ED}$) and the conveyance unit 102 is preferably configured to be able to change its position or posture such that they can be close to each other. For example, as another embodiment, the whole conveyance unit 101 may be tilted or moved such that the conveyance terminal end $P_{ED}$ comes close to the conveyance unit 102. Alternatively, the conveyance unit 102 may be tilted or moved to be close to the conveyance terminal end $P_{ED}$. As still another embodiment, both of the conveyance units 101 and 102 may be configured to be movable to be close to each other.

Furthermore, according to this embodiment, in the conveyance unit 101, the observation object OB is placed on the liquid pool of the liquid W2 retained in the hydrophilic region R1. Since the liquid pool is maintained on the hydrophilic region R1, the placement position of the observation object OB is appropriately maintained. For this reason, at the time of transfer of the observation object OB, the observation object OB can be transferred to a desired position on the plate PL without causing displacement. In addition, when the observation object OB is placed on the liquid pool, sticking of the observation object OB to the upper surface of the conveyance belt 1011 can be prevented, and at the time of transfer of the observation object OB, the observation object OB can appropriately be released from the conveyance terminal end $P_{ED}$. Furthermore, as described above, at the time of transfer of the observation object OB, the liquid pool assists or promotes the wash-away of the observation object OB by the supplied liquid W4 onto the plate PL. Hence, according to this embodiment, it is possible to more appropriately transfer the observation object OB.

Here, in this embodiment, a form in which the hydrophilic region R1 surrounded by the water repellent region R2 serves as a placement portion configured to retain the liquid pool of the liquid W2 and place the observation object OB has been described. However, the present invention is not limited to this. For example, as another embodiment, when a concave portion is provided in the upper surface of the conveyance belt 1011, the concave portion can be used as a placement portion capable of retaining the liquid W2.

Furthermore, according to this embodiment, when the plate PL is wet with the liquid W3 in advance before the transfer of the observation object OB, at the time of transfer, the observation object OB that has come into contact with the upper surface of the plate PL is attracted on the upper surface and appropriately received by the upper surface. At this time, since the plate PL is in the tilting posture, the excess W3' of the liquid W3 drops, and the plate PL appropriately becomes wet.

Let θ2 be the tilt angle of the plate PL (the angle made by the level surface and the upper surface of the plate PL). If θ2 is made too small, the excess W3' is difficult to drop. If θ2 is made too large, the observation object OB may fall at the time of transfer of it. For this reason, the tilt angle θ2 is set to, for example, 40°<θ2<65°, and preferably, 45°<θ2<60°) approximately.

Here, in this embodiment, a form in which liquids are supplied to the hydrophilic region R1 and the plate PL by the single liquid supply nozzle 1031 capable of reciprocally moving between the conveyance units 101 and 102 has been described. However, the present invention is not limited to this. For example, as another embodiment, if the liquid supply nozzle 1031 is fixed above the conveyance unit 101, the liquid supply unit 103 may further include another liquid supply nozzle fixed above the conveyance unit 102. That is, the liquid supply unit 103 may be provided with two liquid supply nozzles capable of supplying liquids to the conveyance units 101 and 102, respectively. In this case, the liquid supply nozzle corresponding to the conveyance unit 102 may be a spray type nozzle.

OTHER EMBODIMENTS

The present invention is not limited to the above-described examples and may partially be changed without departing from the scope of the present invention, and for example, the features of the embodiments may be combined. For example, some of the processes shown in FIGS. 5A and 5B to 12A and 12B may be omitted, another process may be added, or the order of the processes may be changed. Individual terms described in this specification are merely used for the purpose of explaining the present invention, and the present invention is not limited to the strict meanings of the terms and can also incorporate their equivalents.

The invention claimed is:
1. A specimen preparation device configured to prepare an observation specimen including an observation object placed on a light transmitting plate, comprising:
   a first conveyance unit including a placement portion formed on an upper side of the first conveyance unit, wherein the placement portion is a hydrophilic portion having a hydrophilicity and includes a convex-shaped portion on an upstream side in a conveyance direction, a hydrophobic portion having a hydrophobicity is provided around the placement portion, thereby the placement portion holds a liquid pool thereon for placing the observation object, and thereby the first conveyance unit moves the placement portion including the convex-shaped portion and conveys the observation object;
   a second conveyance unit for conveying the plate such that the plate passes a position where the observation object is transferred from the placement portion of the first conveyance unit; and
   a liquid supply unit for supplying a liquid to the placement portion of the first conveyance unit, wherein
   the second conveyance unit includes a placement plate on which the plate is placed, the placement plate being inclined relative to the upper side of the first conveyance unit and configured to be movable along the inclined direction, and
   the first conveyance unit includes:
      a conveyance belt provided with the placement portion, wherein the conveyance belt is configured to travel;
      a first pulley provided at a conveyance start end of the conveyance belt;

a second pulley provided at a conveyance terminal end of the conveyance belt; and a tilt mechanism configured to bend a conveyance terminal end side of the conveyance belt with respect to the conveyance start end side on an opposite side to freely move the conveyance terminal end close to or away from the second conveyance unit.

2. The specimen preparation device according to claim 1, wherein the hydrophilic portion is a super-hydrophilic portion for which a contact angle of the liquid is not more than 10°, and the hydrophobic portion is a water repellent portion for which the contact angle of the liquid is not less than 90°.

3. The specimen preparation device according to claim 1, wherein the liquid supply unit can further supply a liquid to the second conveyance unit, and the liquid supply unit includes:

a liquid supply nozzle configured to supply the liquid; and a slider mechanism configured to reciprocally move the liquid supply nozzle between the first conveyance unit and the second conveyance unit, and in a case of supplying the liquid to the first conveyance unit, the liquid supply nozzle stops at a position above the convex-shaped portion of the placement portion and supplies the liquid to the convex-shaped portion.

4. The specimen preparation device according to claim 1, wherein the tilt mechanism includes:

a guide member, for guiding a travel of the conveyance belt, configured to be able to tilt; and a motor configured to drive the guide member to be tilted.

5. The specimen preparation device according to claim 1, further comprising cleaning unit, wherein the first conveyance unit includes a conveyance belt provided with the placement portion, the cleaning unit includes:

a container configured to store a cleaning liquid that cleans the conveyance belt; and an ultrasonic generation unit configured to apply an ultrasonic vibration to the container, the first conveyance unit includes:

a first pulley provided in a side of a conveyance start end of the conveyance belt;

a second pulley provided in a side of a conveyance terminal end of the conveyance belt; and a third pulley provided in the container and below the first pulley, and the conveyance belt includes:

a first traveling portion, provided between the second pulley and the third pulley, and configured to travel downward such that at least a part of the conveyance belt passes through the container that stores the cleaning liquid; and a second traveling portion, provided between the first pulley and the third pulley, which is folded from the first traveling portion and configured to travel upward.

6. A specimen preparation method of preparing an observation specimen by placing an observation object on a light transmitting plate, comprising:

a retaining step of retaining a liquid in a placement portion by supplying the liquid to the placement portion so as to form a liquid pool, a hydrophobic portion formed surrounding but not on the placement portion, the hydrophobic portion having a hydrophobicity;

a placement step of placing the observation object on the liquid pool on the placement portion;

a conveyance step of conveying the observation object with the liquid pool on the placement portion; and a transfer step of transferring the observation object from the liquid pool on the placement portion onto the plate, wherein in the transfer step, an additional liquid is supplied to a convex portion located on an upstream side in the conveyance direction on the placement portion and the observation object is carried by a flow of the additional liquid and transferred onto the plate and the plate is inclined relative to the placement portion, and the conveyance step includes:

conveying the observation object placed on the liquid pool, from a conveyance start end to a conveyance terminal end, in a state where the observation object is horizontal; and conveying the observation object placed on the liquid pool, in a state where the observation object is inclined by bending the conveyance terminal end downward with respect to the conveyance start end, and the additional liquid is supplied to the convex portion during bending the conveyance terminal end downward with respect to the conveyance start end.

7. A conveyance belt, used as the first conveyance unit of the specimen preparation device according to claim 1, comprising:

a plurality of placement portions arrayed in a conveying direction, on each of which the observation object is placed; and a hydrophobic portion having a hydrophobicity, which is provided around each placement portion, wherein the liquid supply portion configured to supply an additional liquid to the convex-shaped portion to transfer the observation object onto the plate, and the plurality of placement portions are configured that, while one of the plurality of placement portions is used for transferring the observation object, another placement portion is able to be cleaned up by a cleaning unit.

* * * * *